United States Patent
Lohman et al.

(10) Patent No.: US 12,496,784 B2
(45) Date of Patent: Dec. 16, 2025

(54) SHIMMING WELDED INTERFACE(S) BETWEEN THERMOPLASTIC COMPONENTS

(71) Applicant: Rohr, Inc., Chula Vista, CA (US)

(72) Inventors: Sarah Lohman, San Diego, CA (US); Noushin Bahramshahi, Mission Viejo, CA (US); Michael van Tooren, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 353 days.

(21) Appl. No.: 18/118,484

(22) Filed: Mar. 7, 2023

(65) Prior Publication Data
US 2023/0286223 A1    Sep. 14, 2023

Related U.S. Application Data

(60) Provisional application No. 63/317,449, filed on Mar. 7, 2022.

(51) Int. Cl.
*B29C 65/00* (2006.01)
*B29L 31/30* (2006.01)

(52) U.S. Cl.
CPC ........ *B29C 66/95* (2013.01); *B29C 66/12221* (2013.01); *B29C 66/474* (2013.01); *B29C 66/721* (2013.01); *B29L 2031/3076* (2013.01)

(58) Field of Classification Search
CPC . B29C 66/95; B29C 66/12221; B29C 66/474; B29C 66/721; B29C 66/7212; B29C 65/08; B29C 65/36
USPC .......................................................... 156/64
See application file for complete search history.

(56) References Cited

U.S. PATENT DOCUMENTS

| | | |
|---|---|---|
| 5,705,795 A | 1/1998 | Anderson |
| 5,725,940 A | 3/1998 | Sakai |
| 5,869,814 A | 2/1999 | Scoles |
| 6,565,942 B2 | 5/2003 | Anderson |
| 8,603,279 B2 | 12/2013 | Malasse |
| 9,339,988 B2 | 5/2016 | Kato |
| 9,358,764 B2 | 6/2016 | Prebil |
| 9,422,024 B2 | 8/2016 | Al-Sheyyab |

(Continued)

FOREIGN PATENT DOCUMENTS

DE    102008008200 B4    3/2014

OTHER PUBLICATIONS

Forward Technology, "About Linear Vibration Welding", http://www.forwardtech.com/plastic-assembly/vibration-welders/about-linear-vibration-welding, Nov. 4, 2014.

(Continued)

*Primary Examiner* — James D Sells
(74) *Attorney, Agent, or Firm* — Getz Balich LLC (57) ABSTRACT

A method is provided for joining thermoplastic components. During this method, a skin is provided that is configured from or otherwise includes a skin fiber-reinforced thermoplastic composite. A support member is provided that is configured from or otherwise includes a support member fiber-reinforced thermoplastic composite. A shim is arranged at an interface between the skin and the support member. The shim is configured from or otherwise includes a shim fiber-reinforced thermoplastic composite. The support member is welded to the skin through the shim at the interface.

19 Claims, 11 Drawing Sheets

(56) References Cited

U.S. PATENT DOCUMENTS

| | | | |
|---|---|---|---|
| 9,481,279 B2 | 11/2016 | Sano | |
| 9,751,477 B2 | 9/2017 | Yoshihiro | |
| 10,889,076 B2 | 1/2021 | Yokomizo | |
| 11,001,008 B2 | 5/2021 | Van Tooren | |
| 11,981,090 B2 * | 5/2024 | Ferriell | B29C 66/73751 |
| 2013/0309001 A1 | 11/2013 | Teshima | |
| 2018/0009050 A1 | 1/2018 | Tokita | |
| 2019/0184646 A1 | 6/2019 | Sutton | |
| 2021/0387424 A1 | 12/2021 | Vichniakov | |

OTHER PUBLICATIONS

EP search report for EP23160618.7 dated May 25, 2023.

* cited by examiner

SHIMMING WELDED INTERFACE(S) BETWEEN THERMOPLASTIC COMPONENTS

This application claims priority to U.S. Patent Appln. No. 63/317,449 filed Mar. 7, 2022, which is hereby incorporated herein by reference in its entirety.

BACKGROUND

1. Technical Field

This disclosure relates generally to forming thermoplastic structures and, more particularly, to welding thermoplastic components together.

2. Background Information

Thermoplastic materials are increasingly being used in various aerospace applications. Various methods are known in the art for welding thermoplastic material components together. While these known methods have various advantages, there is still room in the art for improvement. There is a need in the art therefore for improved methods for forming thermoplastic structures with multiple components welded together.

SUMMARY OF THE DISCLOSURE

According to an aspect of the present disclosure, a method is provided for joining thermoplastic components. During this method, a skin is provided that is configured from or otherwise includes a skin fiber-reinforced thermoplastic composite. A support member is provided that is configured from or otherwise includes a support member fiber-reinforced thermoplastic composite. A shim is arranged at an interface between the skin and the support member. The shim is configured from or otherwise includes a shim fiber-reinforced thermoplastic composite. The support member is welded to the skin through the shim at the interface.

According to another aspect of the present disclosure, another method is provided for joining thermoplastic components for an aircraft. During this method, a first component is arranged with a second component. The first component is configured from or otherwise includes a first fiber-reinforced thermoplastic composite. The second component is configured from or otherwise includes a second fiber-reinforced thermoplastic composite. A gap is between the first component and the second component at an interface between the first component and the second component. A parameter of the gap is determined. One of a plurality of shims is selected based on the parameter to provide a selected shim. The selected shim is configured from or otherwise includes a shim fiber-reinforced thermoplastic composite. The selected shim is arranged between the first component and the second component at the interface. The first component is welded to the second component through the selected shim at the interface. The welding includes vibration welding, ultrasonic welding and/or induction welding.

According to still another aspect of the present disclosure, another method is provided for joining thermoplastic component for an aircraft. During this method, a first component is arranged with a second component. The first component is configured from or otherwise includes a first fiber-reinforced thermoplastic composite. The second component is configured from or otherwise includes a second fiber-reinforced thermoplastic composite. A gap is between the first component and the second component at an interface between the first component and the second component. A parameter of the gap is determined. A shim is formed based on the parameter. The shim is configured from or otherwise includes a shim fiber-reinforced thermoplastic composite. The shim is arranged between the first component and the second component at the interface. The first component is welded to the second component through the shim at the interface. The welding is configured from or otherwise includes vibration welding, ultrasonic welding and/or induction welding.

The support member may be welded to the skin via a single weld that extends through a thickness of the shim."

"The support member may be welded to the skin via a first weld between the support member and the shim and a separate second weld between the shim and the skin.

The selected shim may have a first configuration. A second one of the shims may have a second configuration that is different than the first configuration. The shims may be formed prior to the determining of the parameter of the gap.

The support member may be welded to the skin through the shim along a length of the interface.

The support member may be welded directly to the skin along a first portion of the interface. The support member may be welded to the skin through the shim along a second portion of the interface.

The shim may extend vertically between the skin and the support member. The shim may have a constant vertical thickness as the shim extends longitudinally and/or laterally along the interface.

The shim may extend vertically between the skin and the support member. The shim may have a vertically thickness that changes as the shim extends longitudinally and/or laterally along the interface.

The method may also include: providing a plurality of shims; and selecting one of the shims based on a configuration of a gap between the support member and the skin at the interface without the shim. The selected one of the shims is the shim that is to be arranged at the interface between the skin and the support member.

The one of the shims may be selected based on a size of the gap.

The one of the shims may be selected based on a geometry of the gap.

The method may also include: determining a parameter of a gap between the support member and the skin at the interface without the shim; and manufacturing the shim based on the parameter.

The method may also include welding the support member to the skin at a second interface that is discrete from the interface.

The support member may be concurrently welded to the skin at the interface and the second interface.

The support member may be directedly welded to the skin at the second interface.

The method may also include: arranging a second shim at the second interface between the skin and the support member, where the second shim may be configured from or otherwise include second shim fiber-reinforced thermoplastic composite; and welding the support member to the skin through the second shim at the second interface.

The shim fiber-reinforced thermoplastic composite may be configured as or otherwise include carbon fibers within a thermoplastic matrix.

The welding may include ultrasonic welding, vibration welding and/or induction welding the support member to the skin through the shim at the interface.

The support member may be configured as or otherwise include a support surface. The shim may be configured as or otherwise include a shim surface that is abutted against the support surface. A surface area of the shim surface may be equal to between ninety percent (90%) and one-hundred and ten percent (110%) of a surface area of the support surface.

The method may also include forming an aircraft component. The aircraft component may include the skin, the support member and the shim. The skin may form an exterior surface of the aircraft component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1A:
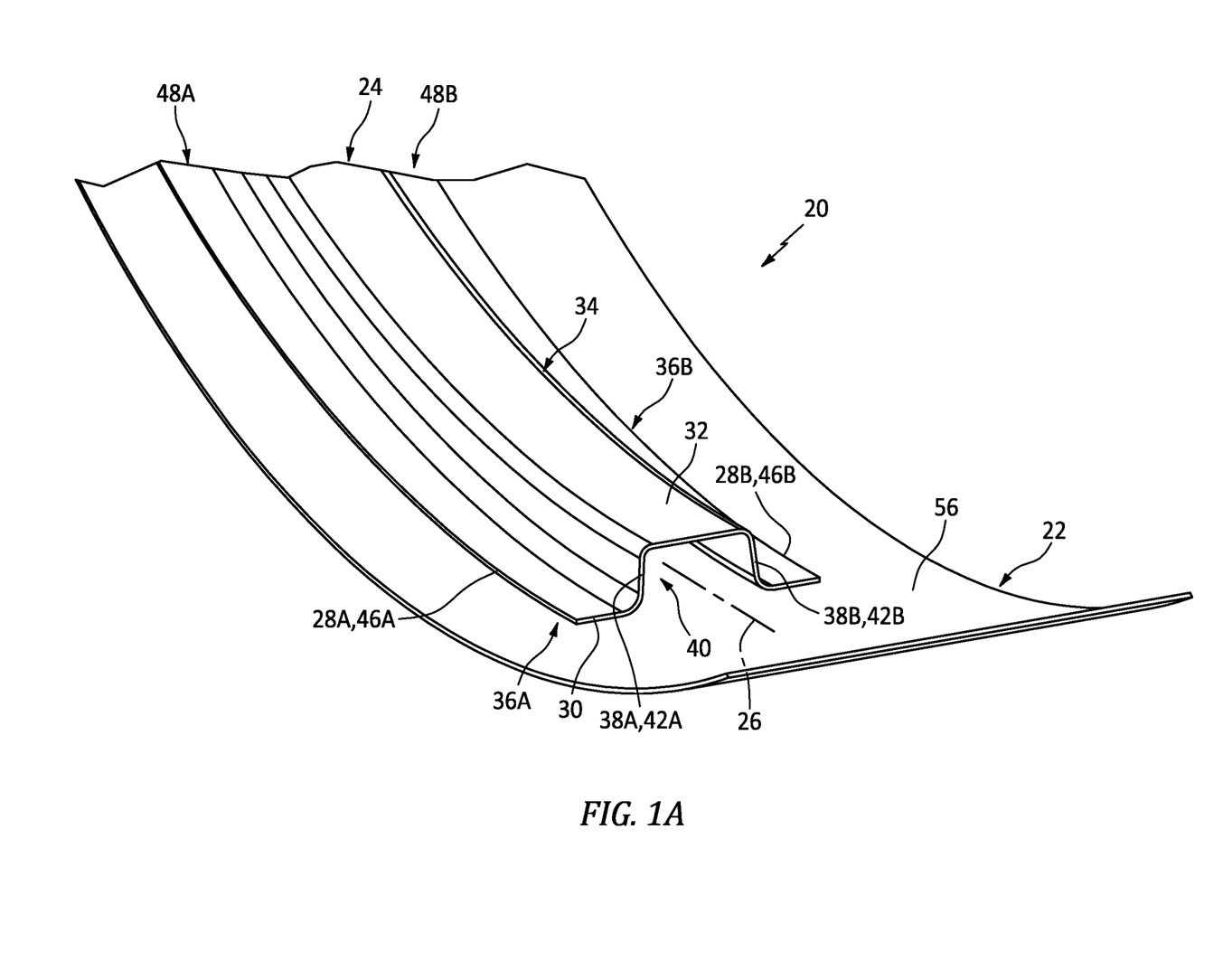
FIG. 1A is a perspective illustration of a portion of a fiber-reinforced thermoplastic structure.
Figure 1B:
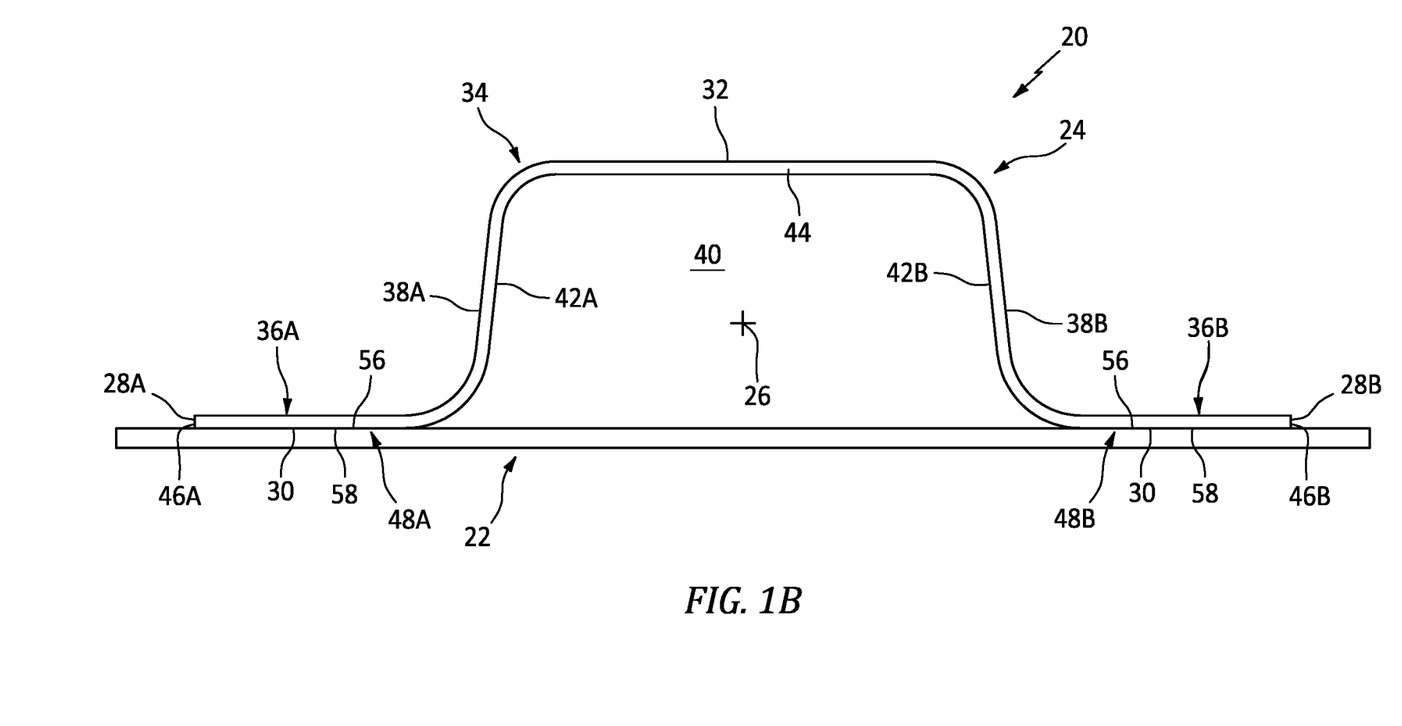
FIG. 1B is an illustration of an end of a portion of the fiber-reinforced thermoplastic structure.

FIGS. 1A and 1B illustrate a portion of a fiber-reinforced thermoplastic structure 20 for an aircraft. This structure 20 may be configured as part of a propulsion system for the aircraft. The structure 20, for example, may be configured as a component of a nacelle. Examples of the nacelle component include, but are not limited to, a fan cowl, an outer barrel, an inner barrel, an inlet lip skin and a translating sleeve. The structure 20 may alternatively be configured as a component of a fuselage or a wing of the aircraft. The structure 20 may still alternatively be configured as a component arranged within the aircraft fuselage; e.g., a component within a cabin of the aircraft. The present disclosure, however, is not limited to the foregoing exemplary aircraft structures. Furthermore, it is contemplated the structure 20 of the present disclosure may also be configured for non-aircraft applications. However, for ease of description, the structure 20 may be referred to and/or described below as an aircraft structure such as the nacelle structure.

The aircraft structure 20 of FIGS. 1A and 1B includes a plurality of components including an exterior skin 22 and a support member 24; e.g., a structural support. The support member 24 may be configured as a stiffener, a pedestal, a structural core and/or any other member which stiffens, holds, locates and/or otherwise supports the aircraft structure 20 and/or its exterior skin 22. Examples of the stiffener include, but are not limited to, a rib, a stringer, a longeron, a beam and a truss. However, for ease of description, the support member 24 may be referred to and/or described below as a stiffener; e.g., a hat shaped stiffener.

The support member 24 of FIG. 1A extends longitudinally along a longitudinal centerline 26 of the support member 24. The support member 24 extends laterally between and to a first side 28A of the support member 24 and a second side 28B of the support member 24. The support member 24 extends vertically between and to an exterior side 30 of the support member 24 and an interior side 32 of the support member 24.

The support member 24 of FIG. 1A includes a channeled base 34 and one or more mounts 36A and 36B (generally referred to as "36"); e.g., flanges. The channeled base 34 extends longitudinally along the longitudinal centerline 26. The channeled base 34 extends laterally between and to a first side 38A of the channeled base 34 and a second side 38B of the channeled base 34. The channeled base 34 extends vertically between and to (or about) the support interior side 32 and the support exterior side 30. The channeled base 34 is configured with a U-shaped cross-sectional geometry when viewed, for example, in a reference plane perpendicular to the longitudinal centerline 26. This configuration provides the channeled base 34 with a channel 40 that extends longitudinally in (e.g., through) the support member 24 and its channeled base 34. The channel 40 extends laterally in (e.g., within) the support member 24 and its channeled base 34 between opposing sidewalls 42A and 42B (generally referred to as "42") of the channeled base 34. The channel 40 projects vertically into the support member 24 and its channeled base 34 from the support exterior side 30 to an endwall 44 of the channeled base 34.

Each of the mounts 36 is connected to (e.g., formed integral with) the channeled base 34. Each of the mounts 36 is disposed at (e.g., on, adjacent or proximate) the support exterior side 30. Each of the mounts 36A, 36B projects laterally out from a respective one of the base sidewalls 42A, 42B to a distal end 46A, 46B of that mount 36. These mounts 36A, 36B project may laterally out from the channeled base 34 and its base sidewalls 42A, 42B in opposite directions and away the channel 40; however, the present disclosure is not limited to such an exemplary mount arrangement. Each of the mounts 36 is welded to the exterior skin 22 at/along a respective interface 48A, 48B (generally referred to as "48") between the support member 24 and its mount 36A, 36B and the exterior skin 22.

Figure 2:
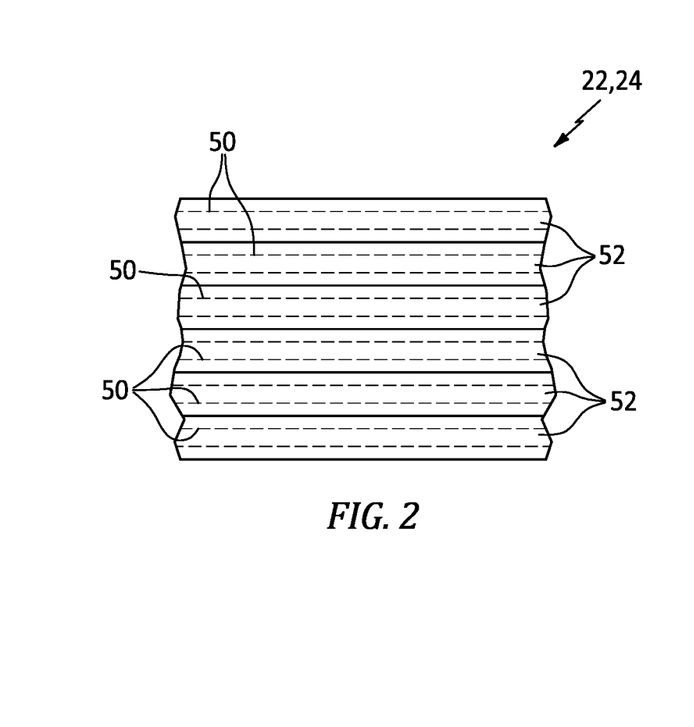
FIG. 2 is a partial sectional illustration of a structure component with a multi-layer configuration.

Referring to FIG. 2, the aircraft structure components 22 and 24 may be constructed from one or more layers of component material, where the component materials of the aircraft structure components 22 and 24 may be common component materials (e.g., the same component materials) or unique component materials (e.g., different component materials). Each component material may be a fiber-reinforced thermoplastic composite. Fiber-reinforcement 50, for example, may be embedded within a thermoplastic material 52; e.g., a thermoplastic matrix. Examples of the fiber-reinforcement 50 include, but are not limited to, metal fibers (e.g., aluminum fibers, brass fibers, and stainless steel fibers), carbon fibers including graphite fibers (e.g., polyacrylonitrile (PAN)-based carbon fibers, rayon-based carbon fibers, lignin-based carbon fibers, and pitch-based carbon fibers), insulating fibers (e.g., glass fibers), organic fibers (e.g., aramid fibers, polyparaphenylene benzoxazole (PBO) fibers, polyphenylene sulfide fibers, polyester fibers, acrylic fibers, nylon fibers, and polyethylene fibers), and inorganic fibers (e.g., silicon carbide fibers and silicon nitride fibers). Some or all of these fibers may be continuous fibers. Some or all of the fibers may also or alternatively be chopped fibers. The present disclosure, however, is not limited to the foregoing exemplary fiber-reinforcement materials or fiber types.

Examples of the thermoplastic material 52 include, but are not limited to, a semi-crystalline thermoplastic resin and an amorphous thermoplastic resin. Examples of the semi-crystalline thermoplastic resin include, but are not limited to, polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include, but are not limited to, polyethylene terephthalate (PET), polybutylene terephthalate (PBT), polytrimethylene terphthalate (PTT), polyethylene naphthalate (PEN), and liquid crystal polyester. Examples of the polyolefin include, but are not limited to, polyethylene (PE), polypropylene (PP), and polybutylene. An example of the polyarylene sulfide includes, but is not limited to, polyphenylene sulfide (PPS). An example of the fluororesin includes, but is not limited to, polytetrafluoroethylene. Examples of the amorphous thermoplastic resin include, but are not limited to, polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic materials.

Figure 3A:
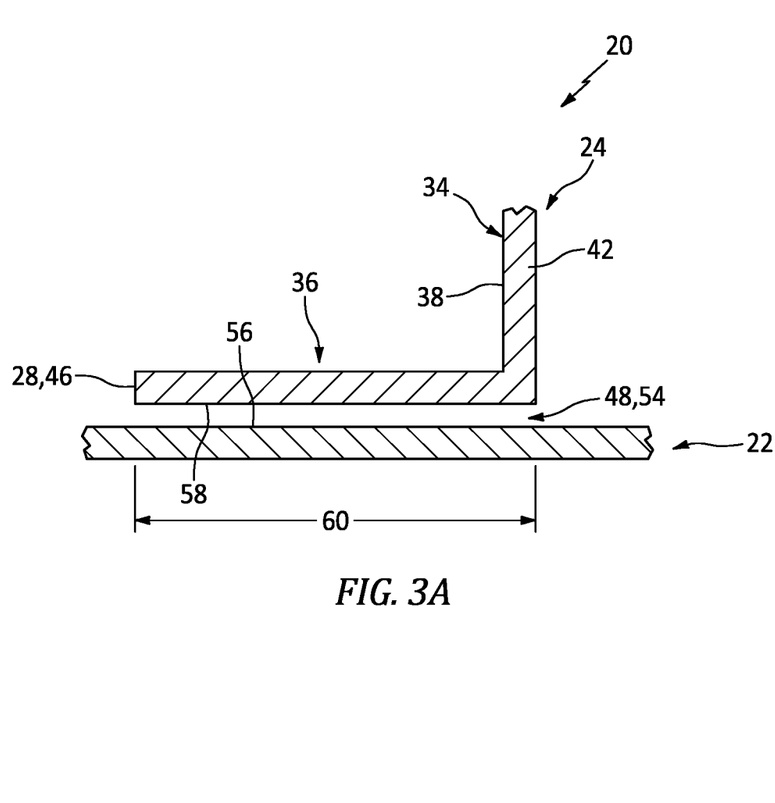
FIG. 3A is a lateral sectional illustration of a portion of the fiber-reinforced thermoplastic structure at an inter-component gap.
Figure 3B:
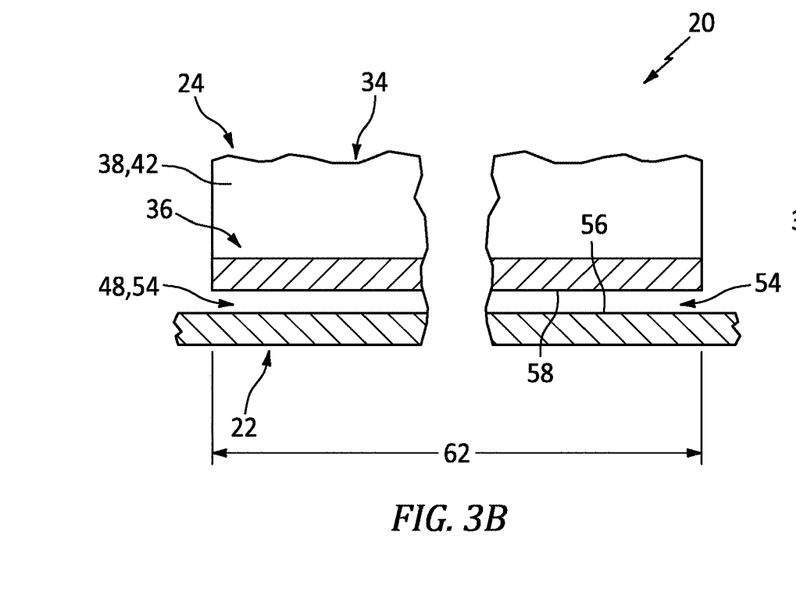
FIGS. 3B and 3C are longitudinal sectional illustrations of portions of the fiber-reinforced thermoplastic structure at the inter-component gap with various configurations.
Figure 3C:
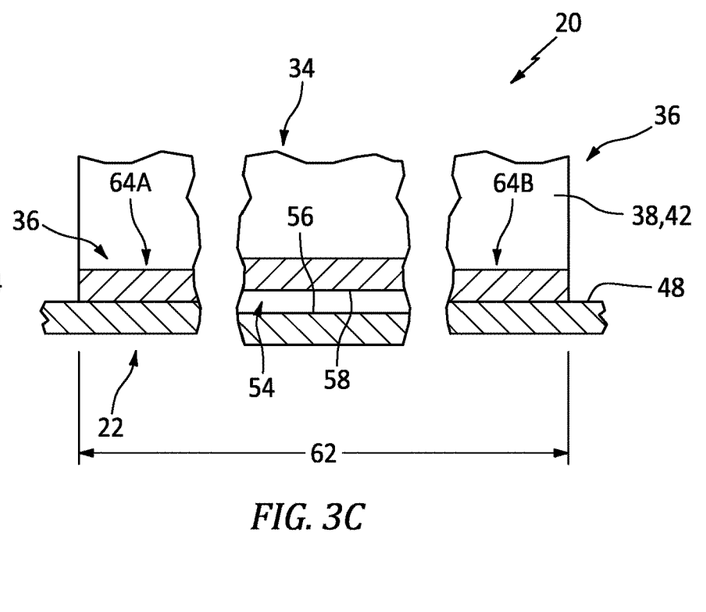

The aircraft structure components 22 and 24 are formed using one or more manufacturing processes. Examples of these manufacturing processes include, but are not limited to, stamp forming, compression molding, injection molding, over-molding and laminating. Referring to FIGS. 3A-C, due to (e.g., dimensional, geometric, etc.) deviations in the aircraft structure components 22 and 24 within tolerances for the respective manufacturing process(es), one or more inter-component gaps 54 (one visible in FIGS. 3A-C) may be defined when the actual support member 24 (versus the design space support member) is arranged with (e.g., abutted against, engaged with, etc.) the actual exterior skin 22 (versus the design space exterior skin). The inter-component gap 54 of FIGS. 3A-C, for example, is formed vertically between the support member 24 and the exterior skin 22. More particularly, the inter-component gap 54 of FIGS. 3A-C extends vertically between and to an interior surface 56 of the exterior skin 22 and a support surface 58 (e.g., flange surface) of the support member 24 and a respective one of its mounts 36 (e.g., flanges), where these component surfaces 56 and 58 are typically designed to contact one another (e.g., lay flush against one another) absent deviations.

The inter-component gap 54 of FIG. 3A extends (e.g., partially or completely) laterally across the interface 48 between the exterior skin 22 and the respective mount 29. The inter-component gap 54 of FIG. 3A, for example, extends along an entire lateral width 60 of the respective mount 36 and its support surface 58. Of course, in other embodiments, at least a portion of the support member 24 and its support surface 58 may contact and/or lay flush against the exterior skin 22 and its interior surface 56.

The inter-component gap 54 of FIGS. 3B and 3C extends (e.g., partially or completely) longitudinally along the interface 48 between the exterior skin 22 and the respective mount 36. The inter-component gap 54 of FIG. 3B, for example, extends along an entire longitudinal length 62 of the respective mount 36 and its support surface 58. The inter-component gap 54 of FIG. 3C, by contrast, extends along a portion of the longitudinal length 62 of the respective mount 36 and its support surface 58. With such an arrangement, one or more portions 64A and 64B of the respective mount 36 and its support surface 58 may vertically contact (e.g., lay flush against) the exterior skin 22 and its interior surface 56.

Figure 4A:
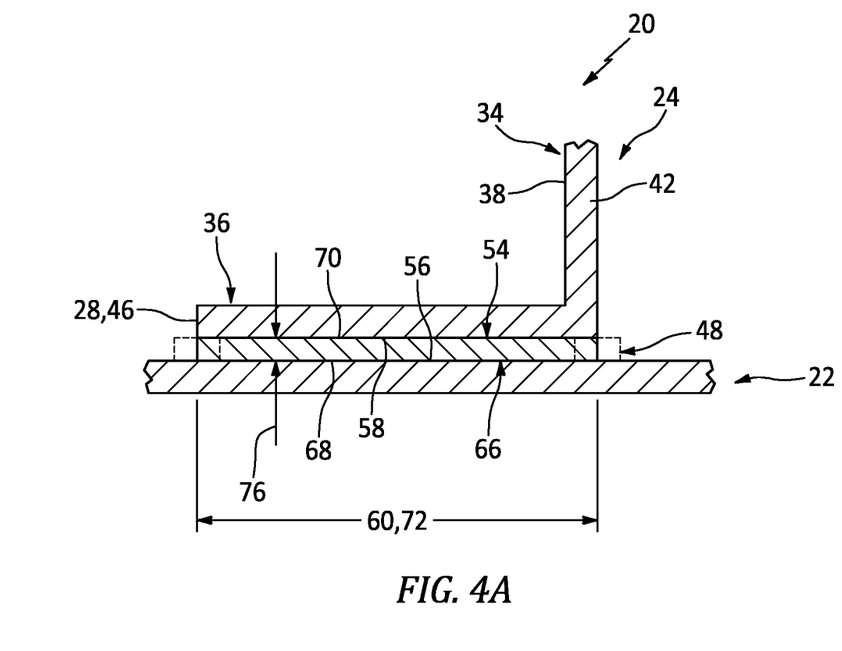
FIG. 4A is a lateral sectional illustration of a portion of the fiber-reinforced thermoplastic structure at an inter-component shim.
Figure 4B:
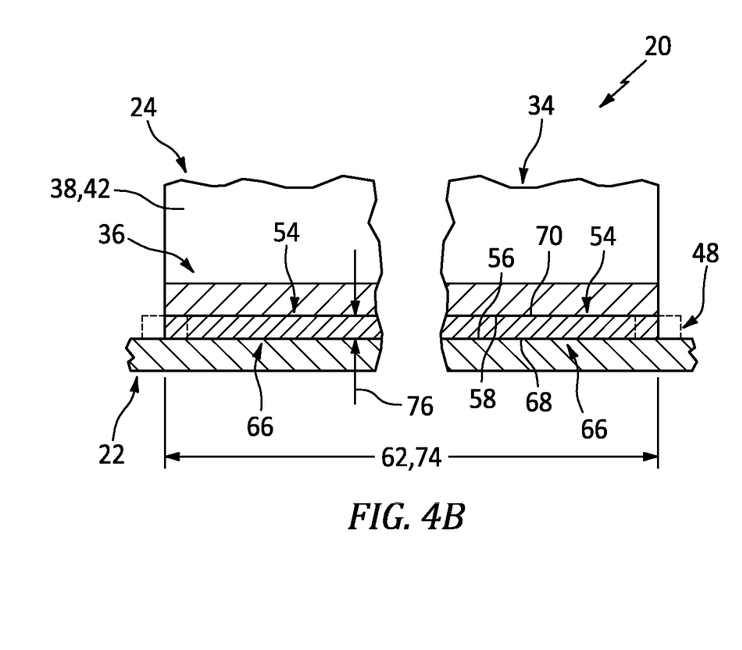
FIGS. 4B and 4C are longitudinal sectional illustrations of portions of the fiber-reinforced thermoplastic structure at the inter-component shim with various configurations.
Figure 4C:
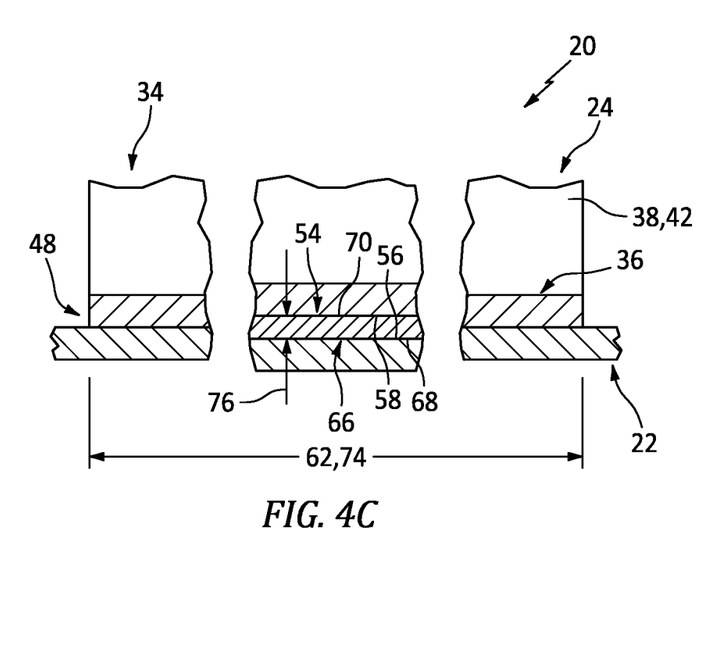

Referring to FIGS. 4A-C, to accommodate the deviations in one or more of the aircraft structure components 22 and 24, one or more inter-component shims 66 (one visible in FIGS. 4A-C) may be provided to plug and/or bridge one or more of the inter-component gaps 54. The inter-component shim 66 of FIGS. 4A-C, for example, is disposed vertically between the support member 24 and the exterior skin 22. More particularly, the inter-component shim 66 of FIGS. 4A-C extends vertically between and to the interior surface 56 and the support surface 58. A skin side surface 68 of the inter-component shim 66 may thereby vertically contact (e.g., lay flush against) the interior surface 56. A support side surface 70 of the inter-component shim 66 may vertically contact (e.g., lay flush against) the support surface 58. The inter-component shim 66 may be configured with exactly or substantially the same configuration (e.g., size, geometry, etc.) of a respective inter-component gap 54 (see also FIGS. 3A-C) such that the inter-component shim 66 of FIGS. 4A-C completely or substantially fills and/or bridges the inter-component gap 54.

The inter-component shim 66 of FIG. 4A extends (e.g., partially or completely) laterally across the interface 48 between the exterior skin 22 and the respective mount 36. The inter-component shim 66 of FIG. 4A, for example, extends along the entire lateral width 60 of the respective mount 36 and its support surface 58. Of course, in other embodiments, a lateral width 72 of the inter-component shim 66 may be slightly larger than or slightly smaller than the lateral width 60 of the respective mount 36 and its support surface 58; e.g., see dashed lines.

The inter-component shim 66 of FIGS. 4B and 4C extends (e.g., partially or completely) longitudinally along the interface 48 between the exterior skin 22 and the respective mount 36. The inter-component shim 66 of FIG. 4B, for example, extends along the entire longitudinal length 62 of the respective mount 36 and its support surface 58. Of course, in other embodiments, a longitudinal length 74 of the inter-component shim 66 may be slightly larger than or slightly smaller than the longitudinal length 62 of the respective mount 36 and its support surface 58; e.g., see dashed lines. With such an arrangement, a surface area of the support surface 58 may be equal to exactly, or between ninety percent (90%) and one-hundred and ten percent (110%) (e.g., between 95% and 105%) of, of a surface area of the shim support side surface 70. The inter-component shim 66 of FIG. 4C, by contrast, extends along a portion of the longitudinal length 62 of the respective mount 36 and its support surface 58. With such an arrangement, one or more portions of the respective mount 36 and its support surface 58 adjacent the inter-component shim 66 may vertically contact (e.g., lay flush against) the exterior skin 22 and its interior surface 56. The surface area of the support surface 58 may thereby be equal to less than the surface area of the shim support side surface 70. The surface area of the support surface 58, for example, may be equal to between (a) five percent (5%) and twenty-five percent (25%), (b) twenty-five percent (25%) and fifty percent (50%), (c) fifty percent (50%) and seventy-five percent (75%), or (d) seventy-five percent (75%) and ninety-five percent (95%) of the surface area of the shim support side surface 70.

By filling in/bridging the inter-component gap 54 with the inter-component shim 66 at the interface 48, the support member 24 and its respective mount 36 may be welded to the exterior skin 22 along an entirety of, a substantial portion of, or various predetermined locations along a longitudinal length of the interface 48. By contrast, where an inter-component gap 54 remains unfilled, only a portion (if any) of the support member 24 may be welded to the exterior skin 22 along the interface 48. Furthermore, provision of the inter-component shim 66 may facilitate arranging the support member 24 with the exterior skin 22 without deforming (e.g., bending, deflecting, twisting, etc.) either of these aircraft structure components 22 and 24 to fit flush against one another. Such deformation may impart undesirable internal stressed within the aircraft structure 20 and/or lead to deformation (e.g., warping or otherwise misshaping) of the aircraft structure 20.

Figure 5A:
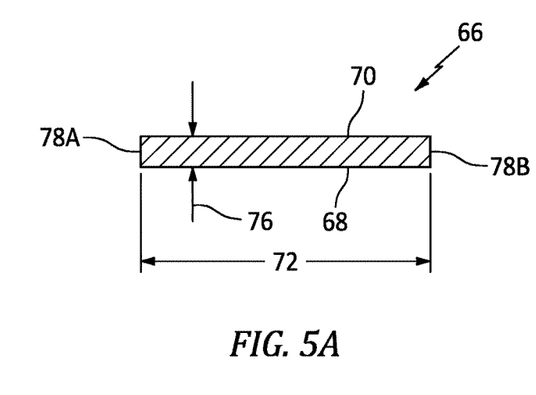
FIGS. 5A and 5B are lateral sectional illustrations of the inter-component shim with various vertical heights along its width.
Figure 5B:
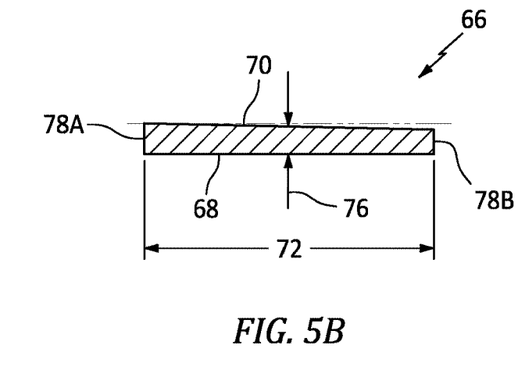

In some embodiments, referring to FIG. 5A, a vertical thickness 76 of the inter-component shim 66 may remain constant laterally across the inter-component shim 66. In other embodiments, referring to FIG. 5B, the vertical thickness 76 of the inter-component shim 66 may (e.g., continuously or intermittently) vary laterally across the inter-component shim 66. The vertical thickness 76 of the inter-component shim 66 of FIG. 5B, for example, decreases as the inter-component shim 66 extends laterally from a first side 78A (e.g., a left side in FIG. 5B) of the inter-component shim 66 to a second side 78B (e.g., a right side in FIG. 5B) of the inter-component shim 66; e.g., the inter-component shim 66 may vertically taper along the lateral width 72 thereof.

Figure 6A:
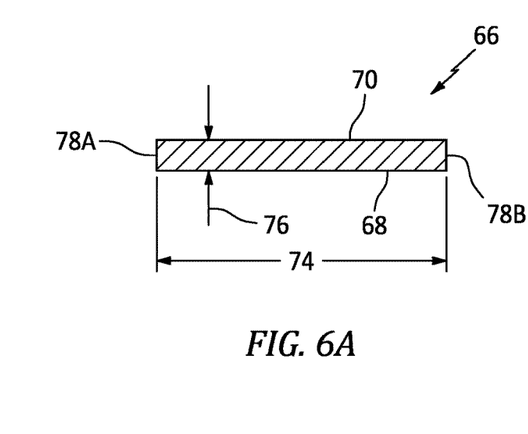
FIGS. 6A-C are longitudinal sectional illustration of the inter-component shim with various vertical heights along its length.
Figure 6B:
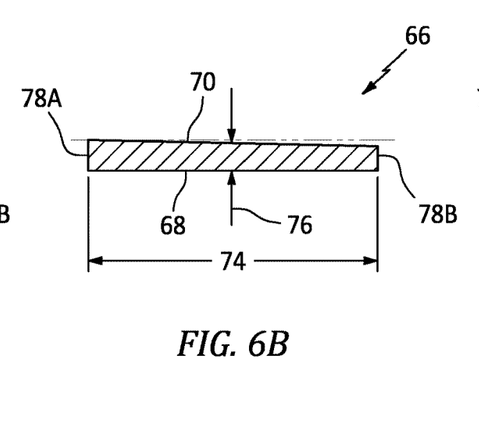
Figure 6C:
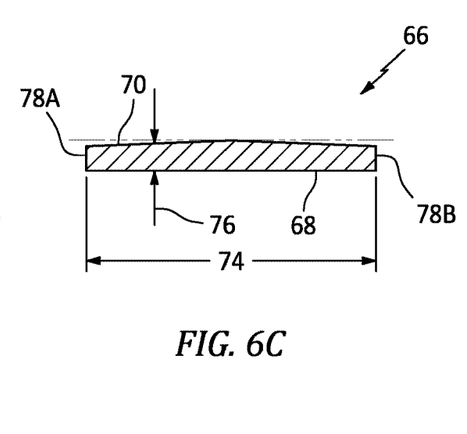

In some embodiments, referring to FIG. 6A, the vertical thickness 76 of the inter-component shim 66 may remain constant longitudinally along the inter-component shim 66. In other embodiments, referring to FIGS. 6B and 6C, the vertical thickness 76 of the inter-component shim 66 may (e.g., continuously or intermittently) vary longitudinally across the inter-component shim 66. The vertical thickness 76 of the inter-component shim 66 of FIG. 6B, for example, decreases as the inter-component shim 66 extends longitudinally from a first end 78A (e.g., a left end in FIG. 6B) of the inter-component shim 66 to a second end 78B (e.g., a right end in FIG. 6B) of the inter-component shim 66; e.g., the inter-component shim 66 may vertically taper along a longitudinal length 74 thereof. In another example, referring to FIG. 6C, the vertical thickness 76 of the inter-component shim 66 may increase and then decrease as the inter-component shim 66 extends longitudinally from the shim first end 78A to the shim second end 78B; e.g., the inter-component shim 66 may vertically flare out and then taper along the longitudinal length 74 thereof.

Figure 7A:
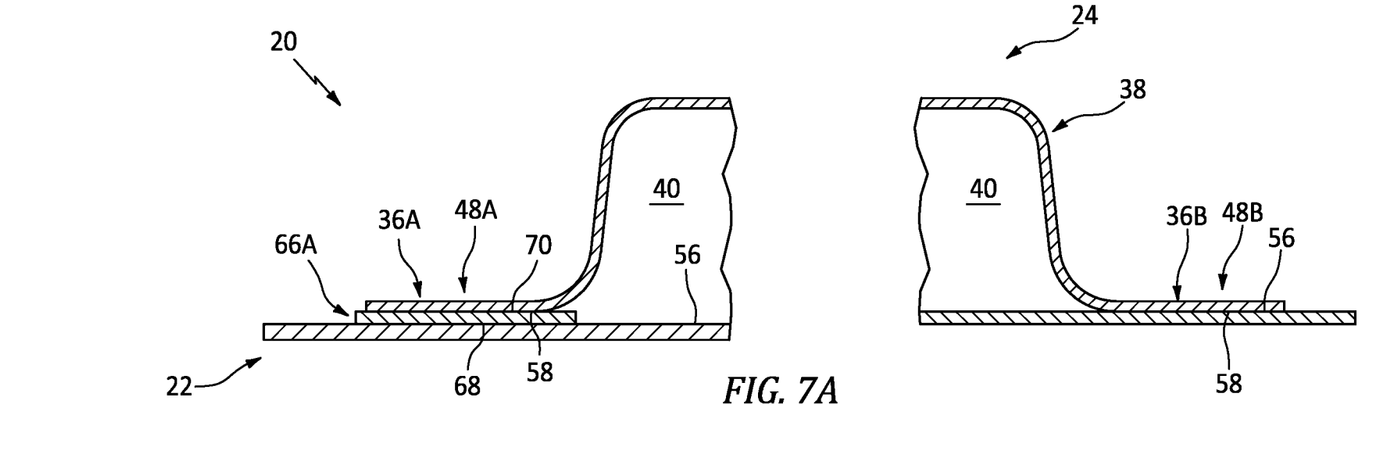
FIG. 7A is a sectional illustration of a portion of the fiber-reinforced thermoplastic structure configured with a single inter-component shim.
Figure 7B:
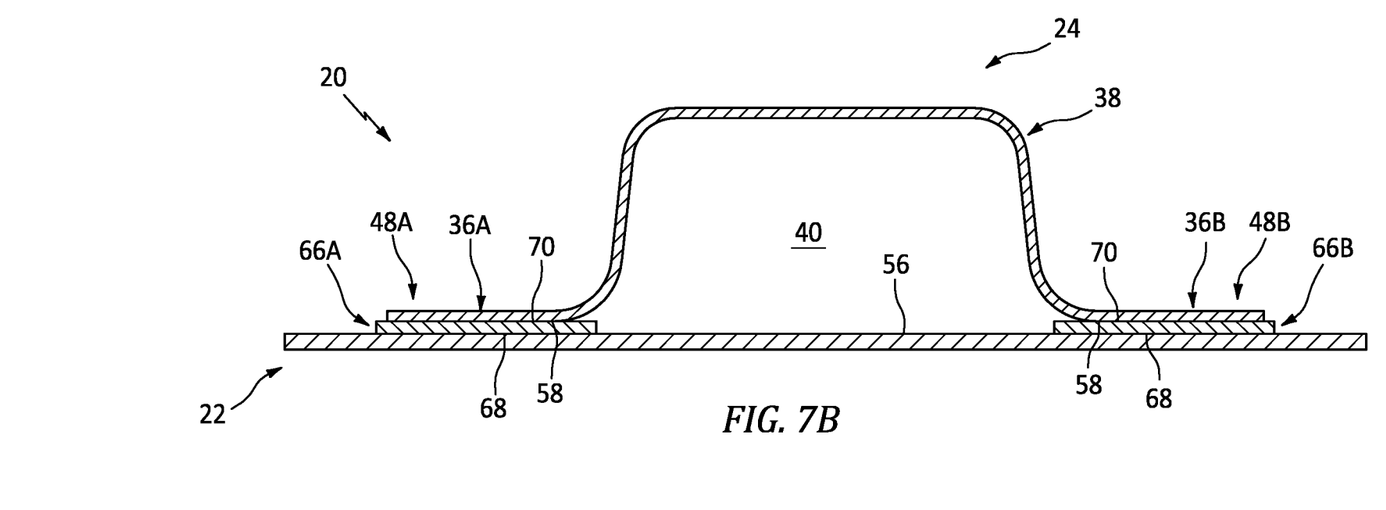
FIG. 7B is a sectional illustration of a portion of the fiber-reinforced thermoplastic structure configured with multiple inter-component shims.

Referring to FIGS. 7A and 7B, one or more or all of the mounts 36 may be arranged with at least one of the inter-component shims 66. For example, referring to FIG. 7A, the inter-component shim 66 may be arranged with a first one of the mounts (e.g., 36A), whereas a second one of the mounts (e.g., 36B) may be configured without an inter-component shim. More particularly, the first mount 36A of FIG. 7A is welded to the exterior skin 22 at the first interface 48A through the inter-component shim 66 according to any one or more of the arrangements described above; e.g., see FIGS. 4A-6C. The second mount 36B of FIG. 7A, however, is welded to the exterior skin 22 directly; e.g., not through an inter-component shim. In another example, referring to FIG. 7B, a respective inter-component shim 66A, 66B (generally referred to as "66") may be arranged with each of the mounts 36A, 36B. More particularly, each mount 36 of FIG. 7B is welded to the exterior skin 22 through a respective one of the inter-component shims 66 according to any one or more of the arrangements described above; e.g., see FIGS. 4A-6C.

Figure 8A:
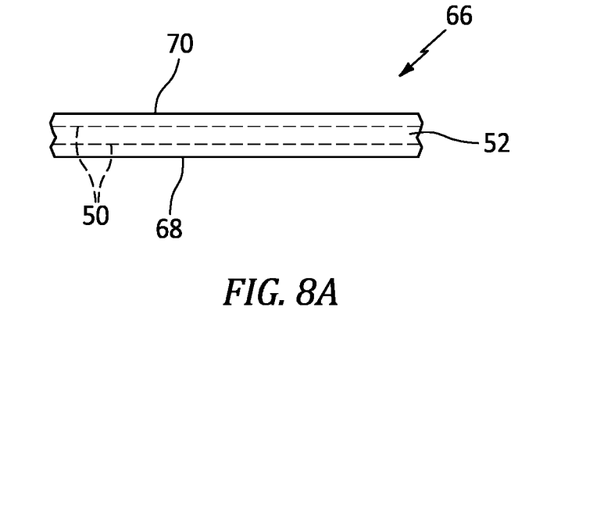
FIGS. 8A and 8B are partial sectional illustrations of the inter-component shim with various constructions.
Figure 8B:
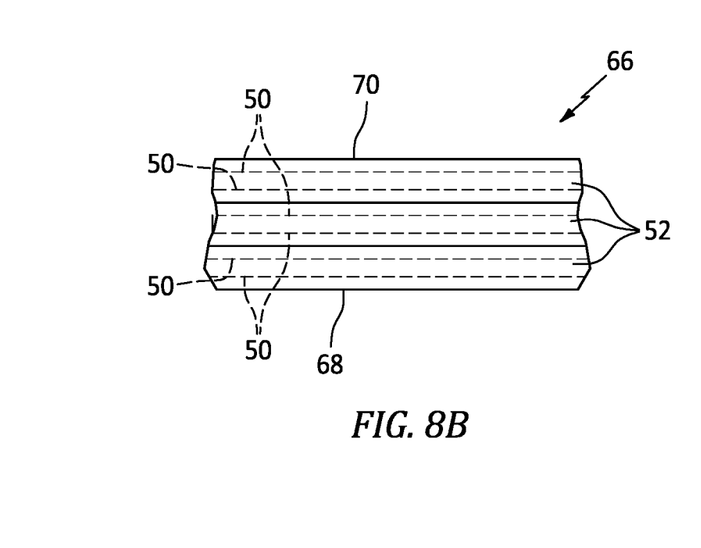

Referring to FIGS. 8A and 8B, each inter-component shim 66 may be constructed from one or more layers of a material that is the same as or different than the support member material and/or the exterior skin material. Each inter-component shim 66, more particularly, may be constructed from a fiber-reinforced thermoplastic composite. Fiber-reinforcement 50, for example, may be embedded within a thermoplastic material 52; e.g., a thermoplastic matrix. Various examples of the fiber-reinforcement 50 and the thermoplastic material 52 are described above; however, the present disclosure is not limited to such exemplary materials.

Figure 9:
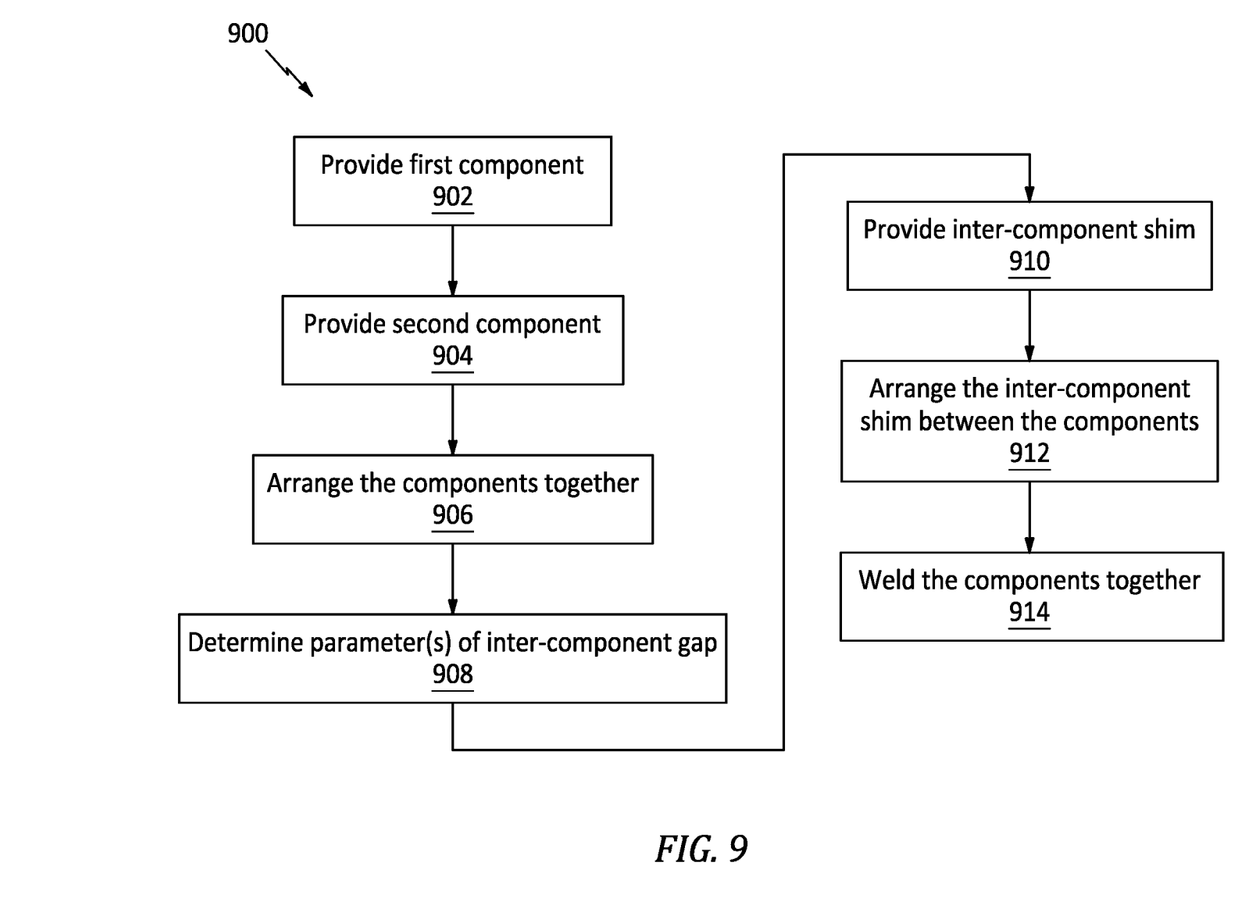
FIG. 9 is a flow diagram of a method for manufacturing a structure.

FIG. 9 is a flow diagram of a method 900 for manufacturing a structure such as, but not limited to, the aircraft structure 20 described above. For ease of description, this method 900 is described below utilizing one inter-component shim 66 for one of the mounts 36. However, in other embodiments, that mount 36 may be arranged with multiple inter-component shims 66 and/or another mount 36 may also be arranged with one or more inter-component shims 66.

In step 902, a first component of the aircraft structure 20 is provided. The exterior skin 22, for example, may be stamp formed, compression molded, injection molded, over-molded and laminated and/or otherwise manufactured as the first structure component.

In step 904, a second component of the aircraft structure 20 is provided. The support member 24, for example, may be stamp formed, compression molded, injection molded, over-molded and laminated and/or otherwise manufactured as the second structure component.

In step 906, the first structure component is arranged with the second component structure. The support member 24, for example, may be disposed with the exterior skin 22 for a test fit. More particularly, referring to FIGS. 3A-C, the support member 24 is abutted against the exterior skin 22 such that the support surface(s) 58 at least partially contact the interior surface 56. Due to deviations in the aircraft structure components 22 and 24 within tolerances for the respective manufacturing process(es) of steps 902 and/or 904, at least one inter-component gap 54 is formed between the support member 24 and the exterior skin 22. This inter-component gap 54 extends between a first of the mounts (e.g., 36A) (e.g., a first mount) and the exterior skin 22; of course, in other embodiments, additional inter-component gaps 54 may be present.

In step 908, one or more parameters of the inter-component gap 54 are determined. One or more dimensions (e.g., vertical height, lateral width and/or longitudinal length) of the inter-component gap 54 may be measured and/or otherwise determined. A geometry (e.g., shape, contour, etc.) of the inter-component gap 54 may also or alternatively be scanned, modeled and/or otherwise determined.

Figure 10:
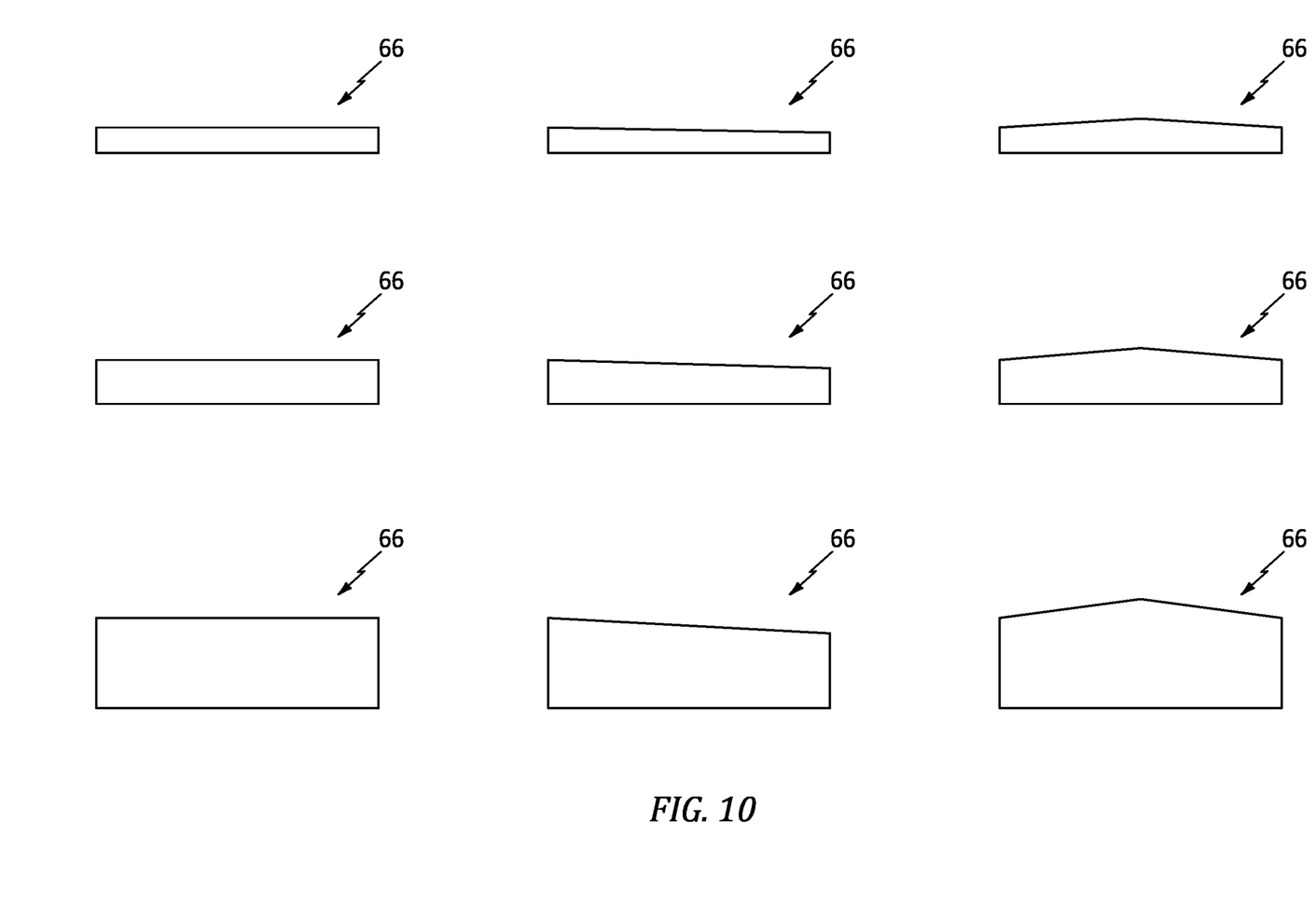
FIG. 10 is a schematic illustration of multiple inter-component shims with various different configurations.

In step 910, an inter-component shim 66 is provided based on the one or more determined parameters. The inter-component shim 66, for example, may be stamp formed, compression molded, injection molded, over-molded and laminated and/or otherwise manufactured according to the dimension(s) and/or geometry determined in the step 908. The inter-component shim 66 may thereby be provided as a made-to-fit (e.g., an exact fit) shim that substantially or completely fills and/or bridges the inter-component gap 54. Alternatively, the inter-component shim 66 may be selected from a plurality of different (e.g., pre-made) available inter-component shims 66. For example, referring to FIG. 10, prior to the step 908 and/or performance of this method 900, a plurality of inter-component shims 66 with different sizes and/or geometries may be manufactured. During the step 910, one of these different (e.g., pre-made) inter-component shims 66 may be selected that most closely matches the size and/or the geometry of the inter-component gap 54. This selected inter-component shim 66 may then be used in the method 900 as is (e.g., without further modification), or modified (e.g., machined) to even more closely match the size and/or the geometry of the inter-component gap 54.

In step 912, the inter-component shim 66 is arranged with the first structure component and the second component structure. The inter-component shim 66 of FIGS. 4A-C, for example, is arranged at the interface 48 between the first mount 36A and the exterior skin 22. More particularly, the inter-component shim 66 of FIGS. 4A-C is disposed vertically between the first mount 36A and the exterior skin 22 so as to partially or completely fill and/or bridge the inter-component gap 54 as described above.

In step 914, the second structure component is welded to the first structure component. The support member 24 of FIG. 7A, for example, is welded to the exterior skin 22 at/along its interfaces 48. The first mount 36A, more particularly, is welded to the exterior skin 22 at/along the first interface 48A through the inter-component shim 66. The first mount 36A, for example, is welded to at least (or only) the inter-component shim 66, and the exterior skin 22 is welded to at least (or only) the inter-component shim 66 at/along the second interface 48B. The second mount 36B, however, may be welded (e.g., directly) to the exterior skin 22. The welding at/along the first interface 48A and at/along the second interface 48B may be performed concurrently (e.g., simultaneously), or separately. The structure elements 22, 24 and 66 may be welded together using ultrasonic welding, vibration welding, induction welding and/or any other suitable (e.g., thermoplastic) welding process.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for joining thermoplastic components, comprising:
providing a skin comprising a skin fiber-reinforced thermoplastic composite;
providing a support member comprising a support member fiber-reinforced thermoplastic composite;
arranging a shim at an interface between the skin and the support member, the shim comprising a shim fiber-reinforced thermoplastic composite; and
welding the support member to the skin through the shim at the interface,
wherein the support member is welded directly to the skin along a first portion of the interface, and
wherein the support member is welded to the skin through the shim along a second portion of the interface.

2. The method of claim 1, wherein the support member is welded to the skin through the shim along a length of the interface.

3. The method of claim 1, wherein
the shim extends vertically between the skin and the support member; and
the shim has a constant vertical thickness as the shim extends at least one of longitudinally or laterally along the interface.

4. The method of claim 1, wherein
the shim extends vertically between the skin and the support member; and
the shim has a vertically thickness that changes as the shim extends at least one of longitudinally or laterally along the interface.

5. The method of claim 1, further comprising:
providing a plurality of shims; and
selecting one of the plurality of shims based on a configuration of a gap between the support member and the skin at the interface without the shim, wherein the selected one of the plurality of shims comprises the shim that is to be arranged at the interface between the skin and the support member.

6. The method of claim 5, wherein the one of the plurality of shims is selected based on a size of the gap.

7. The method of claim 5, wherein the one of the plurality of shims is selected based on a geometry of the gap.

8. The method of claim 1, further comprising:
determining a parameter of a gap between the support member and the skin at the interface without the shim; and
manufacturing the shim based on the parameter.

9. The method of claim 1, further comprising welding the support member to the skin at a second interface that is discrete from the interface.

10. The method of claim 9, wherein the support member is concurrently welded to the skin at the interface and the second interface.

11. The method of claim 9, wherein the support member is directedly welded to the skin at the second interface.

12. The method of claim 9, further comprising:
arranging a second shim at the second interface between the skin and the support member, the second shim comprising second shim fiber-reinforced thermoplastic composite; and welding the support member to the skin through the second shim at the second interface.

13. The method of claim 1, wherein the shim fiber-reinforced thermoplastic composite comprises carbon fibers within a thermoplastic matrix.

14. The method of claim 1, wherein the welding comprising one of ultrasonic welding, vibration welding or induction welding the support member to the skin through the shim at the interface.

15. The method of claim 1, wherein
the support member comprises a support surface;
the shim comprises a shim surface that is abutted against the support surface; and
a surface area of the shim surface is equal to between ninety percent (90%) and one-hundred and ten percent (110%) of a surface area of the support surface.

16. The method of claim 1, further comprising:
forming an aircraft component;
the aircraft component comprising the skin, the support member and the shim, and the skin forms an exterior surface of the aircraft component.

17. A method for joining thermoplastic components for an aircraft, comprising:
arranging a first component with a second component, the first component comprising a first fiber-reinforced thermoplastic composite, the second component comprising a second fiber-reinforced thermoplastic composite, and a gap between the first component and the second component at an interface between the first component and the second component;
determining a parameter of the gap;
selecting one of a plurality of shims based on the parameter to provide a selected shim, the selected shim comprising a shim fiber-reinforced thermoplastic composite;
arranging the selected shim between the first component and the second component at the interface; and
welding the first component to the second component through the selected shim at the interface, the welding comprising vibration welding, ultrasonic welding or induction welding,
wherein the first component is welded directly to the second component along a first portion of the interface, and
wherein the first component is welded to the second component through the selected shim along a second portion of the interface.

18. The method of claim 17, wherein
the selected shim has a first configuration;
a second one of the plurality of shims has a second configuration that is different than the first configuration; and
the plurality of shims are formed prior to the determining of the parameter of the gap.

19. A method for joining thermoplastic component for an aircraft, comprising:
arranging a first component with a second component, the first component comprising a first fiber-reinforced thermoplastic composite, the second component comprising a second fiber-reinforced thermoplastic composite, and a gap between the first component and the second component at an interface between the first component and the second component;
determining a parameter of the gap;
forming a shim based on the parameter, the shim comprising a shim fiber-reinforced thermoplastic composite;
arranging the shim between the first component and the second component at the interface; and
welding the first component to the second component through the shim at the interface, the welding comprising vibration welding, ultrasonic welding or induction welding,
wherein the first component is welded directly to the second component along a first portion of the interface, and
wherein the first component is welded to the second component through the shim along a second portion of the interface.

* * * * *